United States Patent [19]
Kalinowski et al.

[11] Patent Number: 5,198,816
[45] Date of Patent: Mar. 30, 1993

[54] GENERAL PURPOSE SYSTEM FOR DIGITIZING AN ANALOG SIGNAL

[75] Inventors: John T. Kalinowski, Flemington; Augustyn Waczynski, Trenton, both of N.J.

[73] Assignee: EG&G, Inc., Wellesley, Mass.

[21] Appl. No.: 754,916

[22] Filed: Sep. 6, 1991

Related U.S. Application Data

[63] Continuation-in-part of Ser. No. 751,837, Aug. 30, 1991, abandoned.

[51] Int. Cl.$^5$ ............... H03M 1/06; H03M 1/22; H04N 5/335
[52] U.S. Cl. .................. 341/137; 341/172; 341/118; 358/213.15
[58] Field of Search ............ 341/137, 155, 13, 172, 341/118; 358/213.15, 212, 225

[56] References Cited

U.S. PATENT DOCUMENTS

| | | | |
|---|---|---|---|
| 4,647,909 | 3/1987 | Spalding | 341/137 X |
| 4,714,844 | 12/1987 | Muto . | |
| 4,864,522 | 9/1989 | Heimgartner et al. | 341/137 X |
| 5,097,263 | 3/1992 | Delpech et al. | 341/155 |
| 5,144,446 | 9/1992 | Sudo et al. | 358/213.11 |

OTHER PUBLICATIONS

EG&G Model 1430-P CCD Detector, published 1988, pp. 1-1 to 1-3.
EG&G OMA Spec 2000 Applications Software Manual, published Dec. 6, 1989, pp. 47-52.
EG&G Model 1460 and Model 1461 System Configurations Manual, published 1988, p. 73.
"Role of Photodetectors in Optical Signal Processing", G. W. Anderson, et al., Applied Optics, vol. 27, No. 14, 2881-2883 (Jul. 1988).
"Log-converting Processor Element for CCD Linear Imaging Arrays", S. H. Chang et al., Applied Optics, vol. 22, No. 22 (Nov. 1983).
"RCA Photomultiplier Handbook", p. 161.
"Applications of Digital Signal Processing", p. 309 (1978).
"Operational Amplifiers Theory and Practice", John K. Roberge, pp. 568-570.
"Companding D/A and A/D Converters", Nimmo, Microelectron Reliah, vol. 2, No. 3, pp. 343-353 (1981).
"Algorithms for Measurement of Mean Square Value from Data Compressed with the $\mu$-255 Law", H. E. Hanrahan, The Transactions of the SA Institute of Electrical Engineers, pp. 175-178 (Jul. 1980).
"Application Note 39", Linear and Conversion Applications Handbook, pp. 162-173.
"Photodetectors for Acousto-Optic Signal Processors", Gerald M. Borsuk, Proceedings of the IEEE, vol. 69, No. 1, (Jan. 1981).
"A Novel Wide Dynamic Range Silicon Photodetector and Linear Imaging Array", S. G. Chamberlain et al., Transactions on Electron Devices, IEEE, vol. ED-31, No. 2, (Feb. 1984).

Primary Examiner—Sharon D. Logan
Attorney, Agent, or Firm—Finnegan, Henderson, Farabow, Garrett & Dunner

[57] ABSTRACT

A general purpose programmable optical analyzer employs a nonlinear gain at the input stage of an analog to digital converter in order to limit the number of bits used to resolve shot noise.

33 Claims, 15 Drawing Sheets

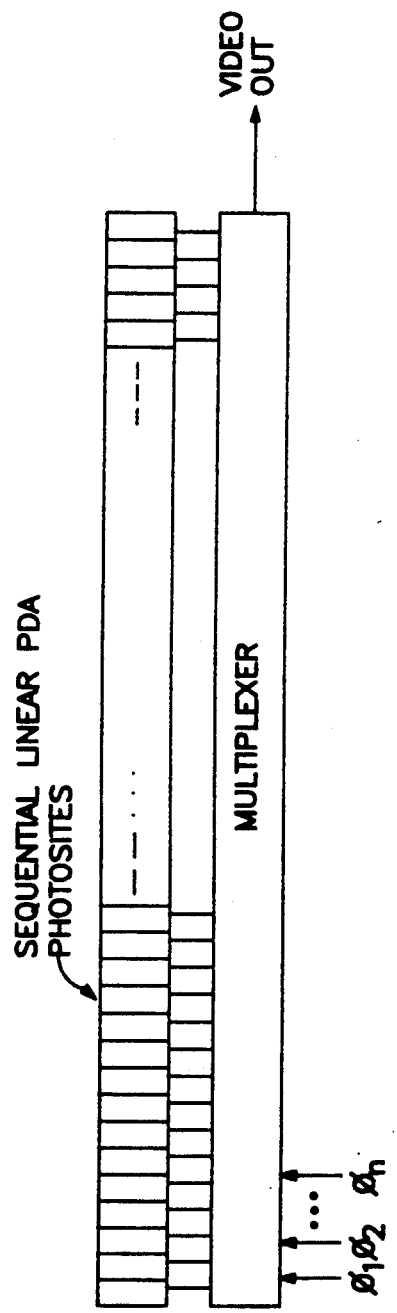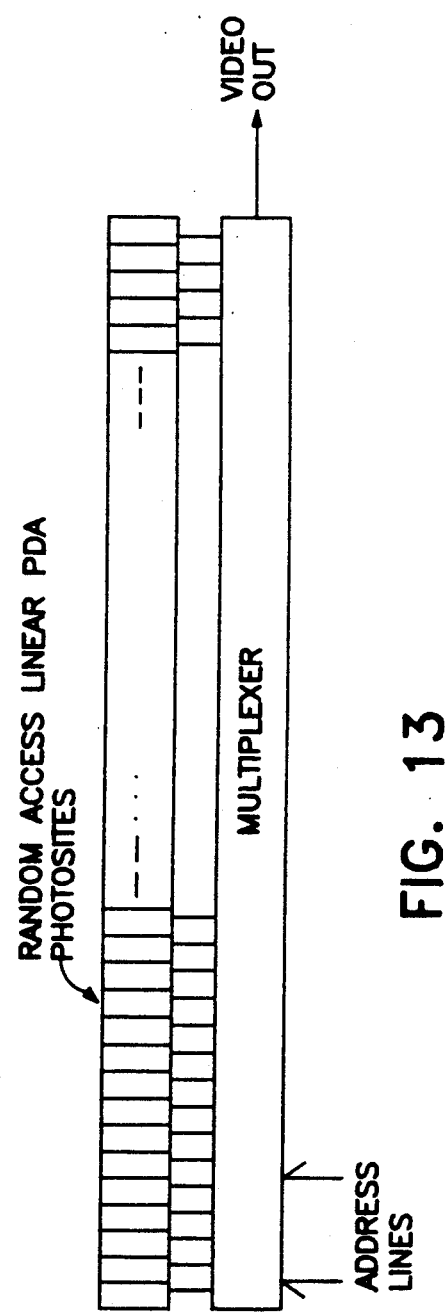

GENERAL PURPOSE SYSTEM FOR DIGITIZING AN ANALOG SIGNAL

This application is a continuation-in-part of copending U.S. application of John T. Kalinowski and Augustyn Waczynski for GENERAL PURPOSE SYSTEM FOR DIGITIZING AN ANALOG SIGNAL, filed Aug. 30, 1991, Ser. No. 07/751,837, abandoned.

BACKGROUND OF THE INVENTION

1. Field of the Invention

The invention relates to a general purpose apparatus for digitizing an analog signal, and more particularly to a general purpose apparatus for digitizing an analog signal having an inherent noise component.

2. Description of the Related Art

A programmable optical analyzer is an instrument for detecting and analyzing light. The analyzer can be adapted to a wide variety of applications by means of software. One class of analyzers employs a charged coupled device (CCD) as an optical sensor and an analog-to digital convertor to convert sensed data into a number.

Programmable CCD read rates make such an analyzer general purpose. By providing a relatively fast read rate, a medium read rate, and a relatively slow read rate, the analyzer can be used for different types of applications. Certain scientific applications may require a relatively high quality signal at the relatively slow read rate. In contrast, image applications may require the relatively fast read rate, but may be able to tolerate signal quality degradation resulting from a fast read rate.

Programmable temperature control also makes the analyzer general purpose, because the optimal operating temperature of the CCD may vary from application to application. For some applications, it is desirable to cool the CCD to as low a temperature as practical in order to limit the amount of dark current generated in the CCD. CCD sensor performance anomalies can occur at very low temperatures, however, making these very low temperatures unsuitable for other types of applications. For example, in spectroscopic applications there is typically a sharply focused line of light imaged onto the surface of the CCD. At very low temperatures one side of the line will be smeared during the data readout. Further, at very low temperatures CCD sensors become less sensitive to the red end of the spectrum making the very low temperatures unsuitable for other types of applications.

Programmable exposure time control allows the analyzer to be used in both high and low light experiments. Exposure time is typically controlled with a shutter.

In summary, a general purpose programmable optical analyzer allows users to trade off certain performance specifications in order to enhance other performance specifications. In designing such a general purpose analyzer, design decisions that may preclude a class of applications should be avoided. For example, although some applications may be concerned with only a portion of the dynamic range, a general purpose analyzer that optimizes resolution at one end of the dynamic range at the expense of resolution at another end of the dynamic range would be undesirable, because such a trade-off might preclude applications that are concerned with resolution at the other end of the dynamic range.

SUMMARY OF THE INVENTION

It is an object of the present invention to provide a general purpose programmable analyzer that exhibits good signal resolution over a large dynamic range.

To achieve these objects and other advantages of the present invention, a general purpose system for digitizing an optical signal, the system comprises multielement light sensing means for converting an optical signal to a first signal; means for selectively controlling the light sensing means in accordance with a set of instructions; means, responsive to the first signal, for generating a second signal having a signal component, and a noise component that is mostly shot noise; means for processing the second signal, with a transfer function characterized by a monotonically decreasing slope, to produce a third signal; means for converting the third signal to a digital number, wherein, for a majority of the dynamic range, the slope of the transfer function is sufficient such that a change of the second signal equivalent to the standard deviation of the noise component results in at least a one digit change in the digital number; and means for converting the digital number to an output using a function corresponding to an inverse function of the transfer function.

The accompanying drawings which are incorporated in and which constitute a part of this specification, illustrate one embodiment of the invention and, together with the description, explain the principles of the invention, and additional advantages thereof.

BRIEF DESCRIPTION OF THE DRAWINGS

FIG. 12 is a simplified view of a linear photodiode array having sequential or randomly ordered pixel selection;

FIG. 13 is a simplified view of a linear photodiode array having sequential pixel selection;

DESCRIPTION OF THE PREFERRED EMBODIMENTS

Figure 1:
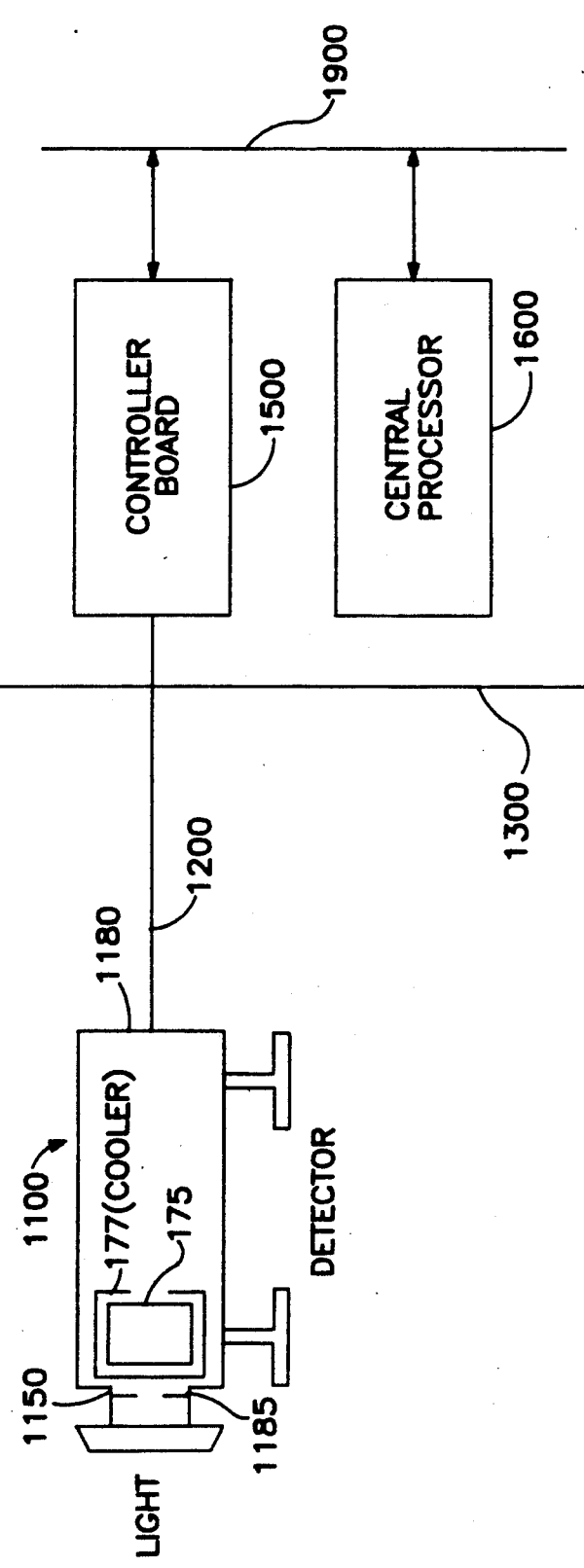
FIG. 1 is a diagram of a general purpose system for digitizing an optical signal according to a first preferred embodiment of the present invention.

FIG. 1 shows a general purpose optical analyzer system, according to a first preferred embodiment of the present invention. A detector 1100 includes a window 1150 and a shutter 1185 through which light may enter to be detected by a charged coupled device (CCD) 1175 within detector housing 1180. A fiber optic link 1200, which can be up to 50 meters in length, provides a noise resistant, opto-isolated, communication link between detector 1100 and a personal computer 1300. A controller board 1500 controls detector 1100. Controller board 1500 plugs into a 16 bit IBM AT-compatible connector.

Fiber optic link 1200 allows detector 1100 to be spatially removed from controller board 1500 such that there is no substantial noise received by detector 1100 from controller board 1500 via electrical coupling through the air. Further, the fact that fiber optic link 1200 is an optical link means that no substantial noise is received via fiber optic link 1200. In other words, detector 1100 is coupled to, and electrically isolated from, controller board 1500.

The system of FIG. 1 is programmable for a diverse variety of spectroscopic applications including raman, luminescence, phosphorescence, pump/probe, astronomical photometry, and dual beam, for example. The system of FIG. 1 is also programmable for a wide variety of imaging applications including streak camera read out, picosecond spectroscopy, single cell fluorescence, light scattering, astronomical imaging, and bio-imaging. The programmable analyzer of the first preferred embodiment has a dynamic range of 18 bits (262,144:1) and a gain of 4–5 electrons per count (per least significant digit) of digital output, as will be discussed in more detail later.

Figure 2:
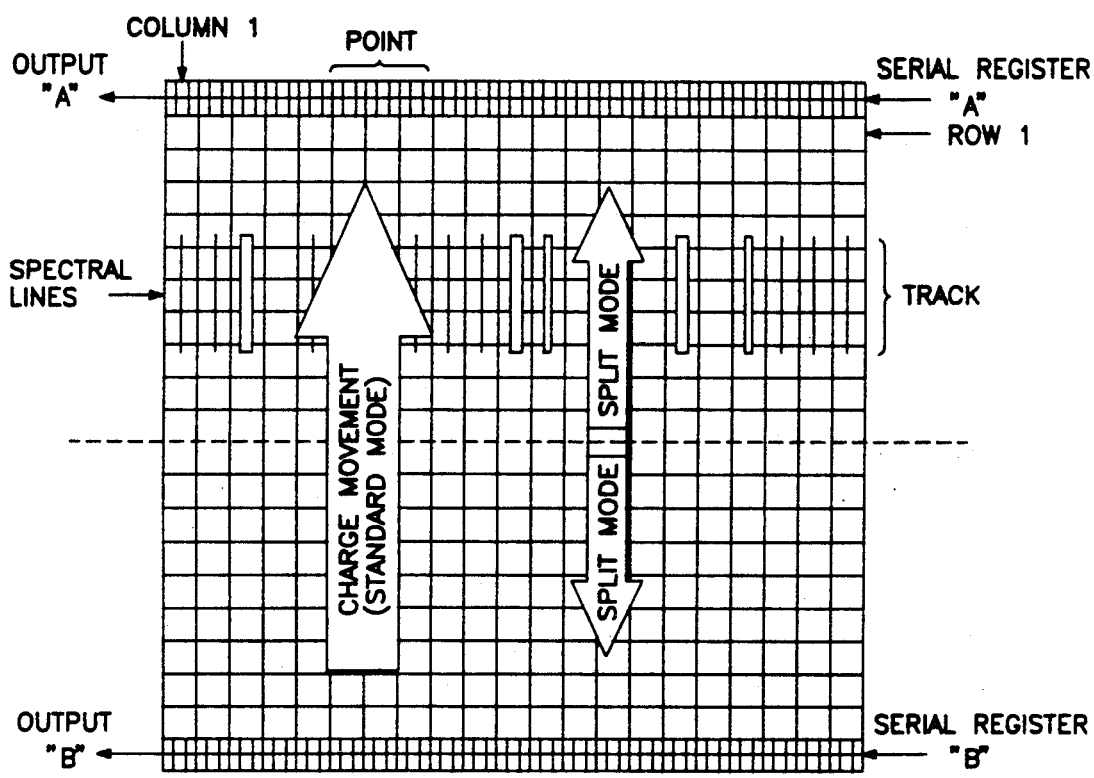
FIG. 2 is a simplified view of the CCD array shown in FIG. 1.

The manner in which CCD 1175 is read out is an important programmable aspect of the system. A scan program is a set of instructions for implementing a CCD readout scheme. A user may specify a scan program, as discussed below, using a menu generated by central processor 1600 executing a program. FIG. 2 shows a simplified view of CCD 1175, a 512×512 pixel Thompson-CSF 7895A, which may be conceptualized as a matrix of light sensitive accumulator sites. Each of the 512×512 pixels has an area of approximately 19 $\mu m \times 19$ $\mu m$. When the matrix is exposed to a spectral source by opening shutter 1185, photons strike the face of the matrix and generate charge in the photo sites. Charge is collected over an exposure time and then shutter 1185 is closed. The accumulated charge in each photo site is shifted one column at a time towards the shift register.

A particular scan program may cause the accumulated charge in each photo site to be shifted one column at a time towards the shift register. A column that has been completely shifted into the shift register is then shifted one charge at a time to the output of the CCD 1175. Another scan program may cause the charge in each photo site to be subjected to "binning" or "grouping" such that charge from multiple photo sites is summed before being read out of CCD 1175. Binning and grouping has certain advantages such as increased detector sensitivity to low level light and, depending on the scan program, reduced readout time.

A user generates a scan program using the menu described above by specifying "points" and "tracks", and by selecting a "shift mode." A point is a set of columns for which pixel data are binned together before being readout from the CCD. Specification of points includes a number of points, a start column specifying the position of the first column to be used during data acquisition, and the number of columns in a point. The points can be specified to be uniform such that there will be no gaps between points, or the points can be specified to be nonuniform, in which case each point must have its own start column and number of columns specified.

Similarly, rows may be grouped into tracks. Typically, tracks correspond to spectra, which are dispersed wavelength components of light, such that the signal from a track is processed and displayed as a curve. Specification of tracks is similar to specification of points, except that a start row and rows per track are specified instead of a start column and columns per point.

Figure 3A:
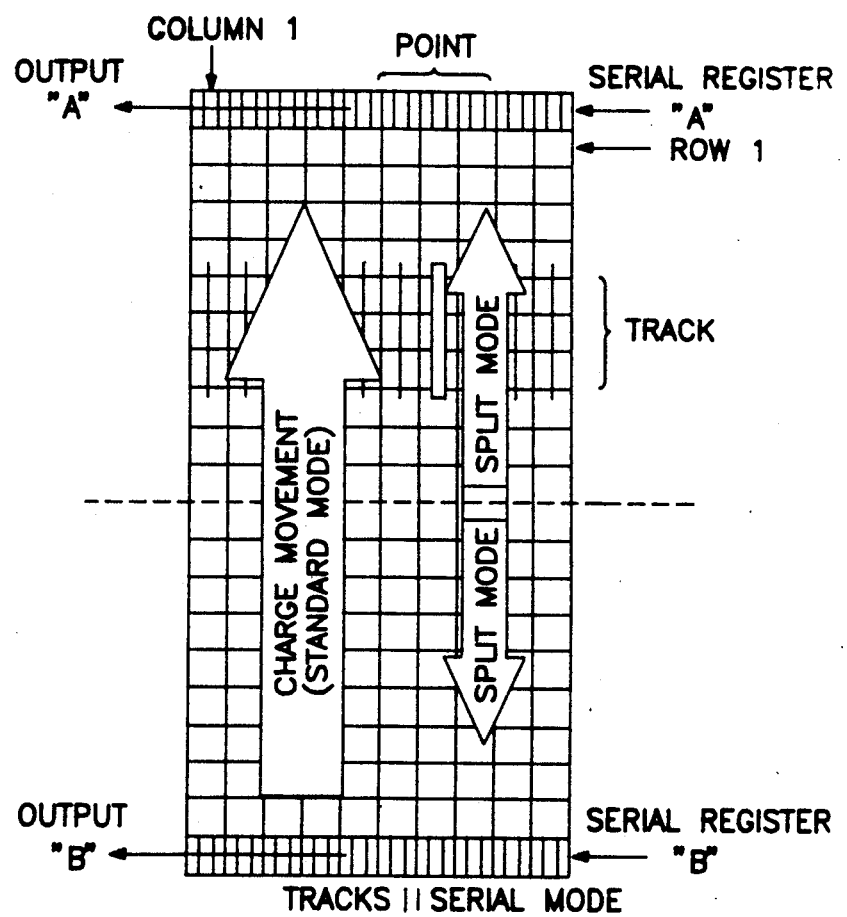
FIG. 3A-3D are a series of diagrams illustrating various shift modes.

FIG. 3A–3D illustrate various shift mode. FIG. 3A shows the array orientation for the tracks parallel to serial mode, in which the tracks are assumed to be parallel to the serial register.

Figure 3B:
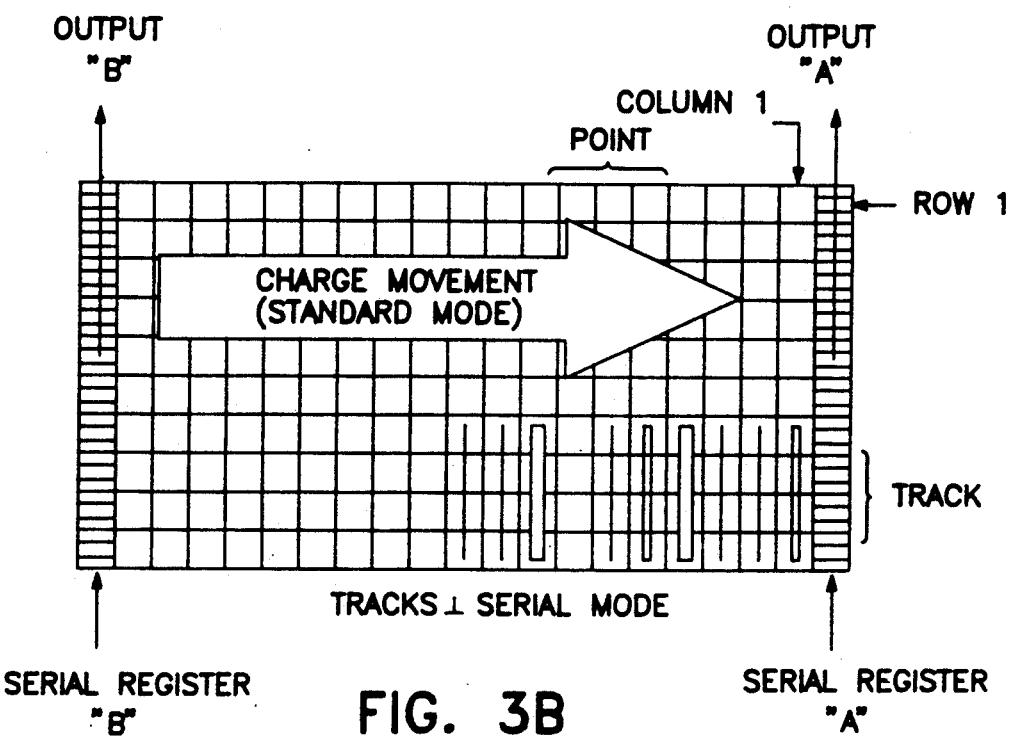

FIG. 3B illustrates the tracks perpendicular to serial mode, in which the entire array is exposed concurrently. The tracks are assumed to be perpendicular to the serial register, and the spectra are assumed to be parallel with rows on the array.

Figure 3C:
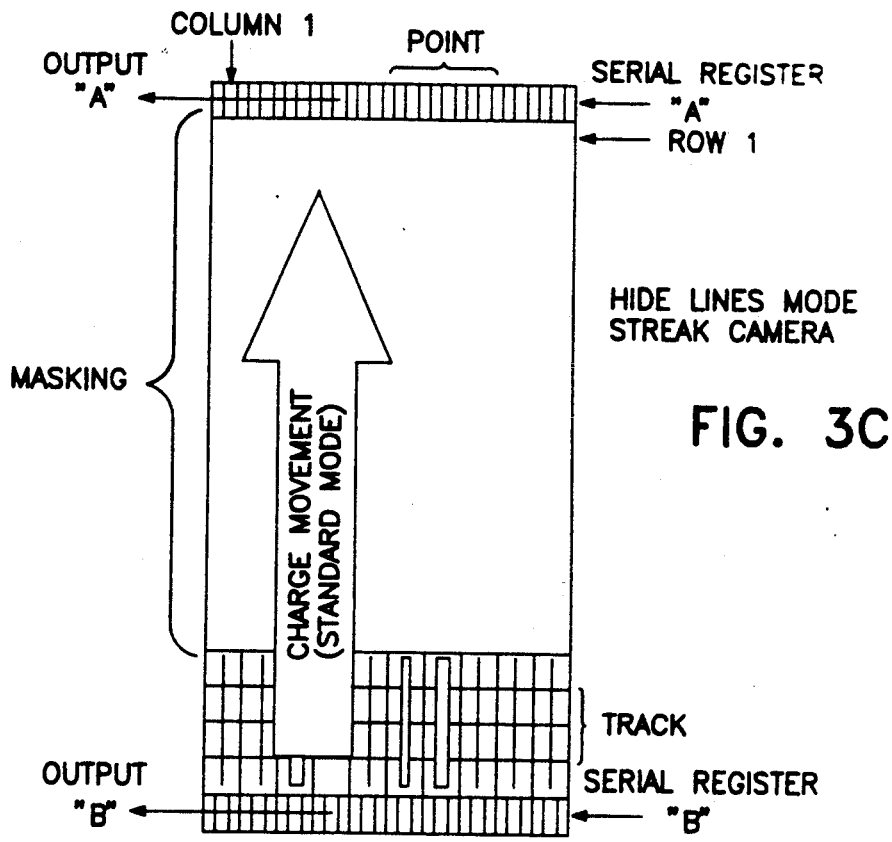

FIG. 3C illustrates the hide lines mode in which both the spectra and the shift register are assumed to be parallel to columns on the array. For each frame acquired in the hide lines mode, all points are first shifted with no readout from the shift register and with the shutter open. The shutter is then closed and the points are then shifted and readout as usual. The hide lines mode is useful if all but a few rows at the end of the array opposite the shift register are masked from light. The optical analyzer mimics a streak camera in hide lines mode.

Figure 3D:
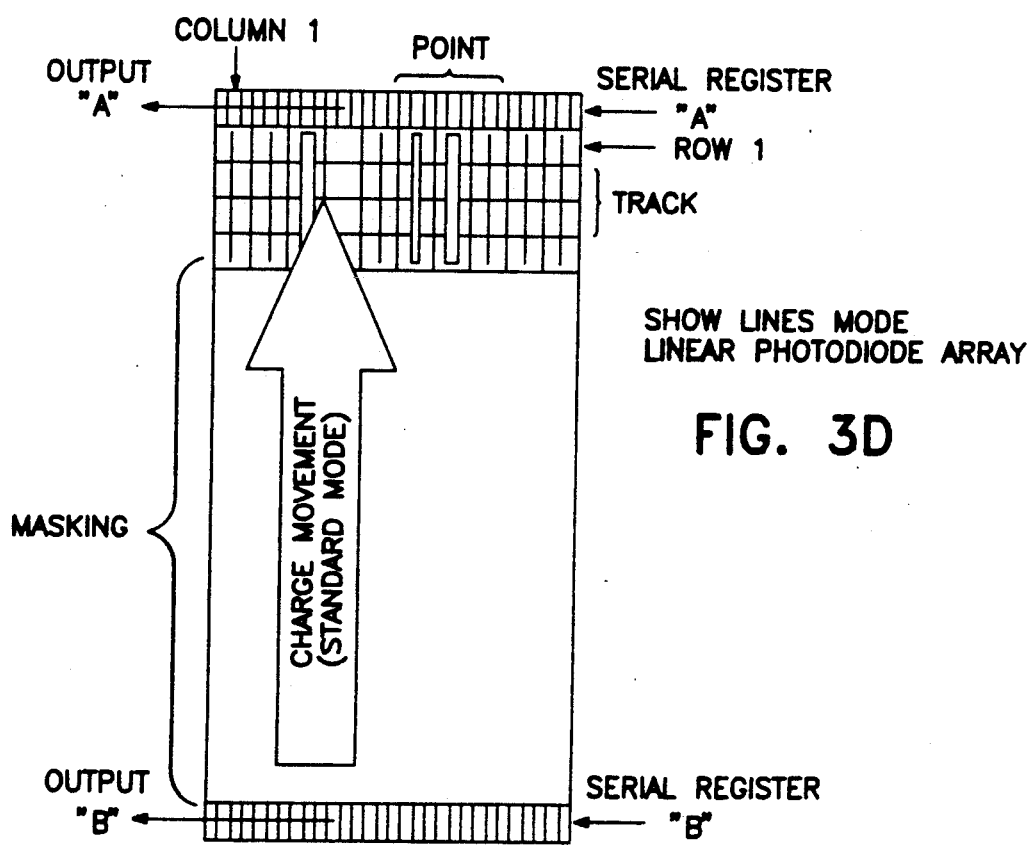

FIG. 3D illustrates the show lines mode in which all but a few columns at the end of the array next to the shift register are masked and the number of tracks is set to 1. During data acquisition, the shutter opens and remains open until all frames have been acquired. The optical analyzer mimics a linear diode array in the show lines mode.

Because the user has the option of specifying how each of the 512 rows, and each of the 512 columns, of CCD 1175 is to be processed, the number of different possible scan programs, or CCD readout schemes, is extremely large.

In addition to the scan program discussed above, a user may also write a data acquisition program that determines the order of events that are to occur when data is acquired. The data acquisition program causes the scan program to be executed one or more times. In the first preferred embodiment, the user writes the data acquisition program using a DOS text editor or a word processor capable of retrieving and saving ASCII text files.

The user may also select a CCD read rate and a CCD operating temperature using a keyboard.

Figure 4:
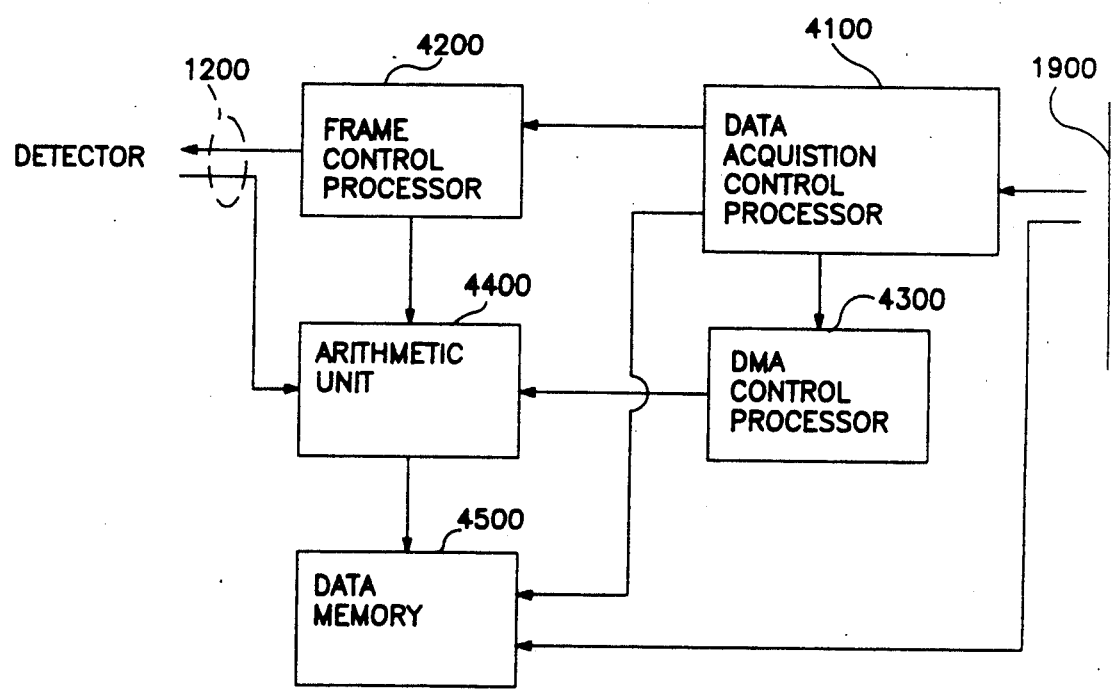
FIG. 4 is a block diagram of the controller board shown in FIG. 1.

The architecture of the first preferred embodiment will now be discussed in more detail. FIG. 4 shows a block diagram of controller board 1500 in more detail. Data acquisition controller processor 4100 includes 64K of program memory and a Motorola 68000 microprocessor. In the first preferred embodiment, data acquisition control processor 4100 operates to execute a data acquisition program.

Frame control processor 4200 and DMA controller processor 4300 are simple processors with a direct addressing mode and minimum looping instructions, and each includes 32K of program memory. Frame control processor 4200, DMA control processor 4300, and arithmetic unit 4400 are implemented within a VLSI technology VGT 200 gate-array ASIC. In the first preferred embodiment, frame control processor 4200 operates to execute a scan program.

The function of frame control 2200 processor is to minimize program memory size for a given experiment. Frame control processor 4200 is activated when data acquisition control processor 4100 executes a frame command within a data acquisition program. When activated, frame control processor 4200 executes a scan setup program, at a speed corresponding to a readout rate of CCD 1175, by generating one 13 bit instruction per pixel, and sending the 13 bit instructions to detector 1100. The sequence of instructions sent to detector 1100 is determined by the scan program. Six of the 13 bits are for an instruction code, two bits are for shutter control, four bits are for triggers, and one bit is to designate a detector instruction or an auxiliary port instruction. In addition, three bits are sent to an address calculation section in arithmetic unit 4400.

In other words, CCD 1175 includes a plurality of photosites, arranged as rows and columns, each photosite being adaptable to hold a charge. Frame control processor 4200 operates to select a first photosite and a second photosite from the plurality of photosites in accordance with the set of instructions, and controls CCD 1175 to combine the charge of the first photosite with the charge of the second photosite.

DMA control processor 4300 also executes a frame command within a data acquisition program, by determining memory addresses in which acquired pixel data is stored. DMA control processor 4300 receives one instruction per frame and generates one instruction per pixel.

Figure 5:
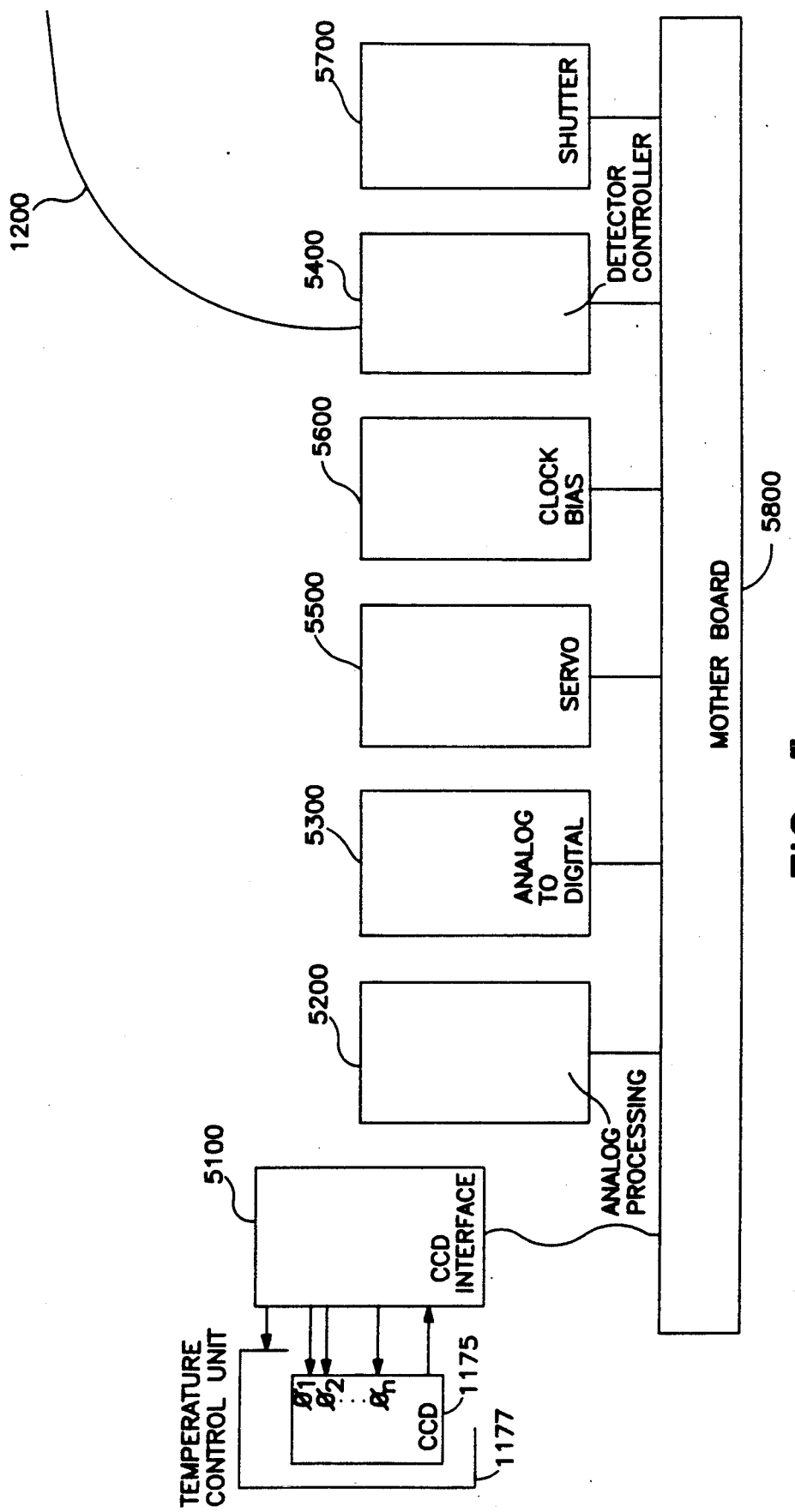
FIG. 5 is a block diagram emphasizing an aspect of the detector shown in FIG. 1.

FIG. 5 is a block diagram showing detector 1100 in more detail. CCD interface board 5100 is located near the front of the detector and functions as an interface between CCD 1175 and other portions of the detector. CCD interface board 5100 distributes power to CCD 1175, and CCD temperature control unit 1177. CCD interface 5100 supplies clock signals $\phi_1$–$\phi_n$ to shift pixel data within CCD 1175 and to read pixel data from CCD 1175, in accordance with an instruction received from frame control processor 4200. CCD interface 5100 sends an analog signal read from CCD 1175 to analog processing board 5200.

Analog processing board 5200 amplifies the signal from CCD 1175 with a nonlinear gain, as discussed in detail below, and sends the amplified signal to analog-to-digital board 5300. Analog-to-digital board 5300 converts the amplified analog signal to an 18 bit digital word, and sends the digital word to detector controller 5400. Detector controller 5400 sends the 18 bit digital word to controller board 1500 via fiber optic link 1200.

In the first preferred embodiment, detector controller 5400 together with CCD interface board 5100 generate a plurality of clock signals for CCD 1175 in response to each instruction generated by frame control processor 4200.

Servo board 5500 contains power supply circuitry. Clock bias board 5600 generates X, Y, Z and V video signals that can be monitored at a rear panel of the detector, and also generates certain bias voltages to be used by the other boards shown in FIG. 5. Shutter board 5700 contains circuitry to open, close, and hold open shutter 1185 and/or an external shutter. Mother board 5800 serves as back plane for the other boards shown in FIG. 5.

Figure 6:
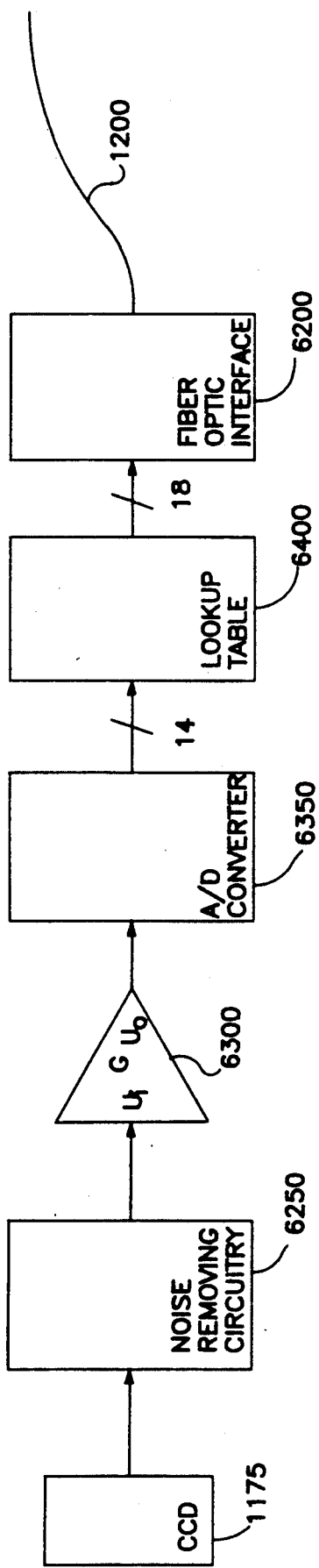
FIG. 6 is a block diagram emphasizing another aspect of the detector shown in FIG. 1.

FIG. 6 is another block diagram of detector 1100, emphasizing a signal path between CCD 1175 and fiber optic link 1200. An analog output of CCD 1175, containing an optical signal and noise generated by the electronics of detector 1100, is sent to noise removing circuitry 6250. Noise removing circuitry 6250 includes circuitry to perform correlated double sampling to remove reset noise, which is noise generated by CCD 1175 during readout of a pixel. An analog output of noise removing circuitry 6250 is applied to nonlinear gain circuit 6300. An analog output of nonlinear gain circuit 6300 is applied to A/D converter 6350. Noise removing circuitry 6250 and nonlinear circuit 6300 both reside on analog processing board 5200.

A/D converter 6350 converts the applied analog value to a 16 bit number. The upper 14 bits of the 16 bit number is translated to an 18 bit number by look up table 6400. Look up Table 6400 contains values corresponding to an inverse function of nonlinear gain circuit 6300 so that the transfer function of the combination of nonlinear gain circuit, A/D converter 6350, and look up table 6400 will be linear. The 18 bit digital number is sent to fiber-optic interface 6200. Both A/D converter 6350 and look up table 6400 reside on analog-to-digital board 5300.

Fiber optic interface 6200 sends the 18 bit number over fiber optic link 1200. Fiber optic interface 6200 resides on detector controller board 5400.

Figure 7:
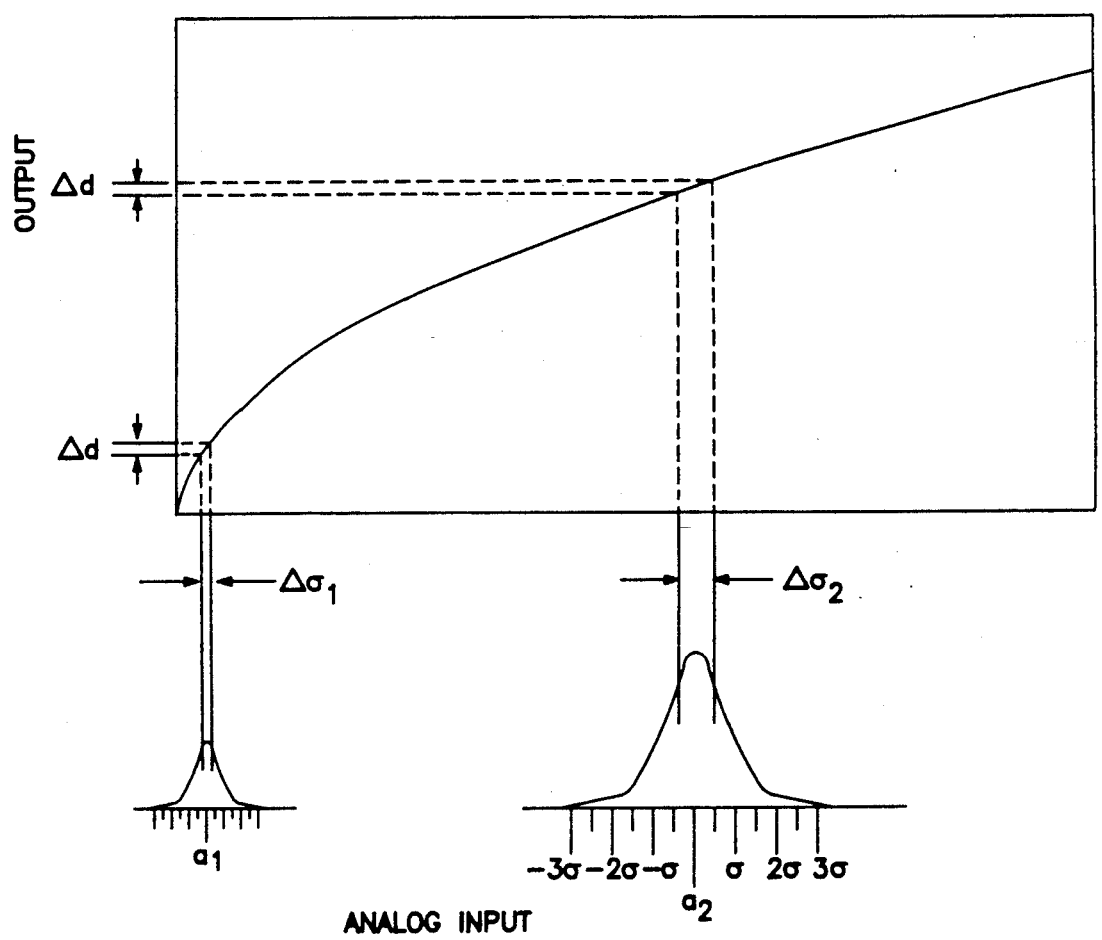
FIG. 7 is a plot of an idealized transfer characteristic of the nonlinear gain circuit shown in FIG. 5.

FIG. 7 plots an idealized version of the transfer function of the nonlinear gain circuit 6300. The nonlinear gain is inversely proportional to the square root of the analog input, thereby ensuring that incremental input changes $\sigma$, having magnitude proportional to the square root of the input, produce uniform output changes. For example, in FIG. 7, different incremental input changes $\Delta\sigma_1$ and $\Delta\sigma_2$ produce the same output change $\Delta d$.

The constant of proportionality determining the relation between the gain and the inverse square root function is chosen such the $\Delta d$ is approximately equal to, or slightly greater than, a value corresponding to the least significant digit of A/D convertor 6350.

The desirability of this nonlinear gain in a general purpose instrument such as the programmable optical analyzer of the preferred embodiments of the present invention will now be discussed. An A/D converter converts an analog input voltage to a digital number. The number can only take one of a series of discrete values, each value corresponding to a range of analog input voltages. q represents the A/D converter quantizer resolution. If q is to be a fixed value, selecting an appropriate value for q involves a trade off between signal resolution and dynamic range. If noise is taken into account, the most efficient use of an A/D converter occurs when the root means square (RMS) of the noise component of the analog input signal is equal to q:

$$\text{RMS noise} = q \qquad [1]$$

Thus, when the A/D converter is used to convert an analog signal having a known and fixed noise component, a fixed q can be selected for efficient use of the A/D converter. In systems in which the noise component of the input signal is not fixed, however, a system with a fixed q generally will not efficiently use the A/D converter for all levels of the noise component of the input signal.

In the signal path shown in FIG. 6, the signal sent from noise removing circuitry 6250 to nonlinear gain 6300 has a noise component composed primarily of shot noise inherent in the optical signal received by CCD 1175. More specifically, photon flux having an average number of photons, $n_p$, has variance in photons of $\sigma_p^2$:

$$\sigma_p^2 = n_p.$$

The standard deviation is expressed as, $$\sigma_p = (n_p)^{0.5},$$

which is equivalent to the root mean square of the noise.

The photons become collected electrons. Quantum Efficiency, QE, affects electron collection so the average number and variance of the collected electrons are related to the incident photons by, $$n_e = QE * n_p \quad [2]$$

$$\sigma_e^2 = QE * n_p. \quad [3]$$

Collected electrons are transformed into The A/D converter output has a standard deviation in digital number of, $$\sigma_{DN} = \sigma_e * A * G * K.$$

Quantization noise of the A/D converter has been ignored because of its negligible affect on the overall noise of the system.

| Since from [3] | $\sigma_e = (QE * n_p)^{.5}$, |
| and assuming | QE = 100%, |
| then | $\sigma_{DN} = (n_p)^{.5} * A * G * K$, | where A, which has a value of $1 \times 10^{-6}$ volts/photon for example, is the gain between the input of a photosite on CCD 1175 and the input of nonlinear gain circuit 6300, and K, which has a value of 1638.3 counts/volt for example, is the gain of A/D converter 6350.

In the programmable analyzer we want to achieve the relationship described in [1].

From [3], for $\sigma_{DN}$ to remain constant for varying light signal levels, gain must take on a value of $$G = C/A(n_e)^{0.05}. \quad [4]$$

Where C is a constant of proportionality.

In summary, the standard deviation of the shot noise is related to the square root of the voltage level. Standard deviations of the signal amplitude due to shot noise at different portions of the dynamic range (X axis) will be different, while corresponding incremental changes in the output of nonlinear circuit 6300 will be equal.

The preferred embodiment of the nonlinear gain will now be discussed. Although the ideal gain is a reciprocal square root function, the preferred embodiment of the present invention approximates the reciprocal square root function using a log circuit to achieve certain design advantages, such as relatively low cost. U.S. Pat. No. 4,714,844 to Muto, the contents of which are herein incorporated by reference, gives a summary of stability problems exhibited by prior art log circuits.

Figure 8:
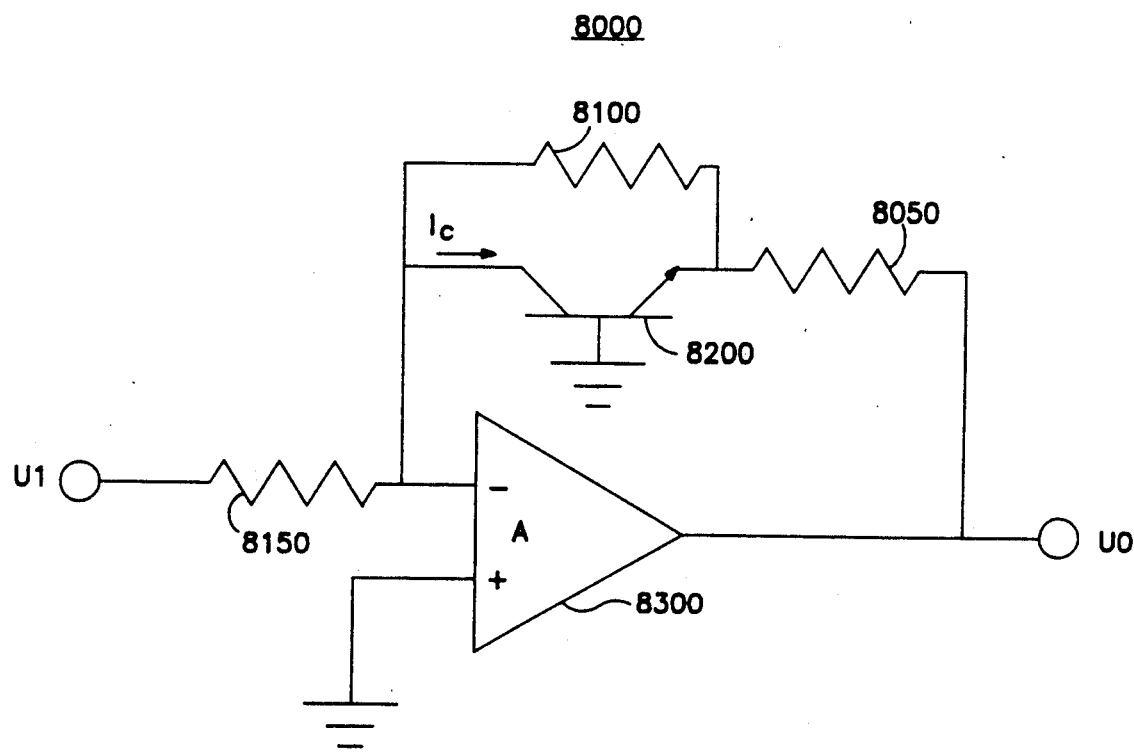
FIG. 8 is a simplified diagram of a circuit for implementing the nonlinear gain circuit shown in FIG. 6.

FIG. 8 shows a simplified diagram of a log circuit 8000 according to a preferred embodiment of the present invention. The circuit includes an amplifier 8300 having a first input terminal coupled to a reference voltage, and a second input terminal coupled to a signal receiving terminal, and an output terminal; a first resistor 8050 having a first end coupled to the amplifier output terminal, and a second end; a second resistor 8100 having a first end coupled to the first resistor second end, and a second input coupled to the amplifier second input terminal; and a transistor 8200 having a current path coupled between the first resistor second end and the amplifier second input terminal, and a control input coupled to the reference voltage.

The circuit of FIG. 8 addresses the instability and frequency response problems typically encountered with conventional log circuits. The circuit of FIG. 8 implements a transfer function approximating that of a conventional log circuit, and exhibits high dynamic range and can process both small and large input signals.

The transfer function of circuit 8000 is described by:

$$Ui = a*Uo + b*[e^{(c*Uo - d*Ui)} - 1].$$

where
Rin is the resistance of resistor 8150,
Rsh is the resistance of resistor 8100,
Rs is the resistance of resistor 8050,
a = Rin/(Rsh + Rin),
b = a*Rsh*Is,
c = q/(K*T),
d = c*Rs/Rin,
and
Is is the reverse saturation current of Q,
q is an electron charge,
K is Boltzman's constant
T is temperature in Kelvin
e is the base of natural logarithm.

Stability and frequency response is improved over a conventional log configuration for small input signals by resistor 8100. For low input signals the attenuation in the feedback loop is high since the gm of transistor 8200 is low for small values of collector current, Ic. Shunting transistor 8200 with resistor 8100 causes circuit 8000 to act as a simple inverting amplifier for low input signals.

Resistor 8050 limits the feedback loop gain and stabilizes circuit 8000 for large input signals is attributable to the high gm of transistor Q for large values of collector current, Ic. The output is taken from the junction of the emitter of Q and the Resistor 8050 resistor. Resistor 8050 corrects the frequency response and is also part of the nonlinear circuit transfer function.

As shown in the transfer function, resistors 8050 and 8100 play a strong role in the transfer function of circuit 8000. Because the transfer function cannot be solved for Uo in a direct way, defining suitable values for resistors 8050 and 8100 requires an iterative approach to satisfy the stability, frequency response and transfer function criteria.

Figure 9:
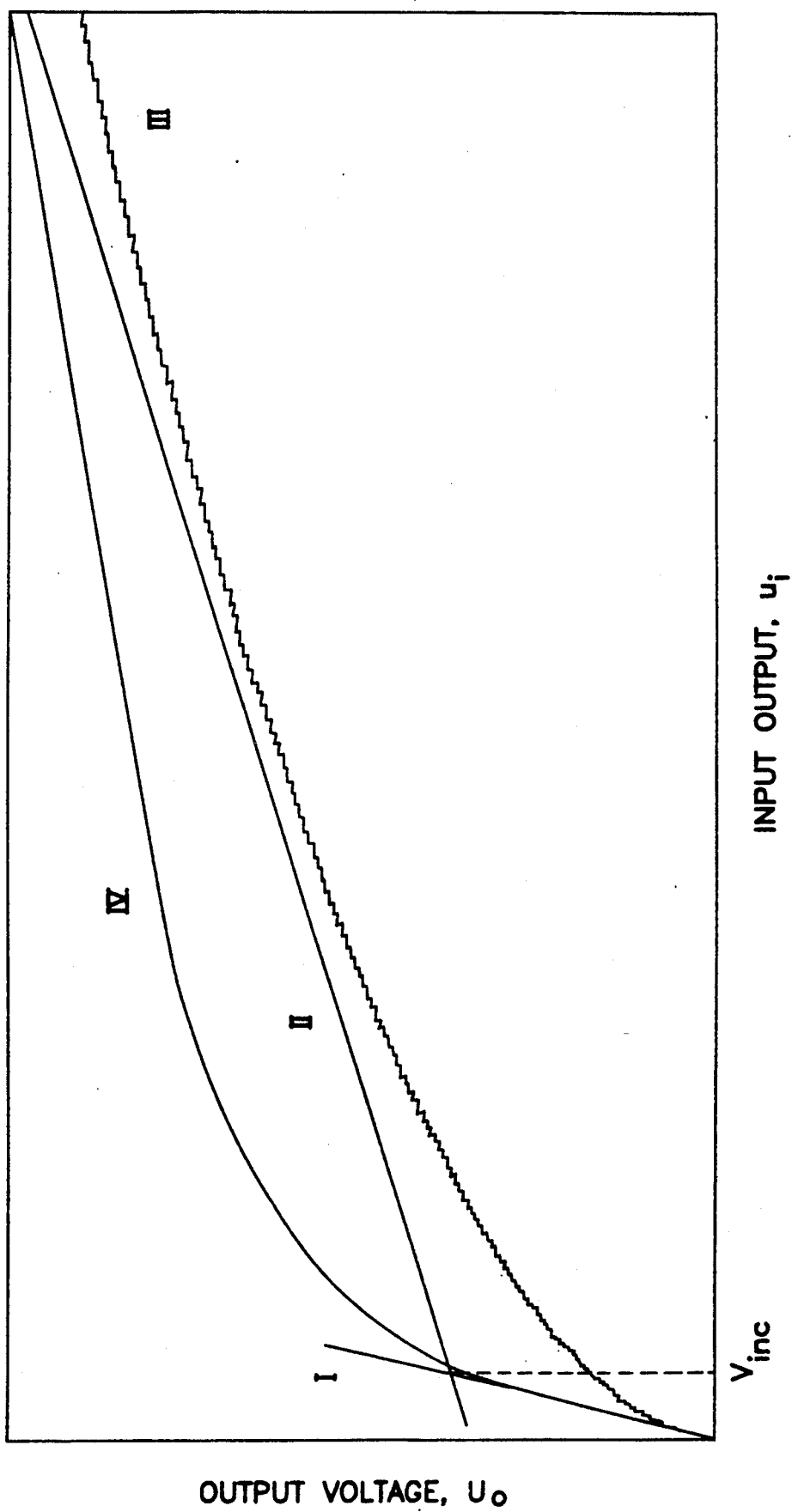
FIG. 9 is a plot of an actual transfer function of the circuit shown in FIG. 8.

FIG. 9 shows a plot of the ideal inverse square root transfer function, shown as III, and the actual transfer function shown as IV. For purposes of determining resistor values, the transfer function is approximated by two lines. Line I has a slope of $$\frac{R_{sh} + R_s}{R_{in}},$$

and corresponds to a lower end of the dynamic range. Line II has a slope $$\frac{R_s}{R_{in}}$$

and corresponds to a higher end of the dynamic range. Lines I and II intercept at Vinc=0 .55V, which is the voltage at which transistor 8200 begins to turn on. For the preferred embodiment, one of the constraints on the resistor values is that lines I and II be above the ideal transfer function curve III.

While complying with the constraint on lines I and II, values of Rs and Rsh can be calculated. Rin can be assumed along with full scale input and output voltages ($FS_{in}$ and $FS_o$ respectively). Values of Rin and $FS_{in}$ are usually influenced by considerations such as system electrical noise, bandwidth and dynamic range. $FS_o$ is set by the slope of line II.

Rs can be calculated from the equation $$R_s = (FS_o - V_{BE})(R_{in}/FS_{in})$$

where $V_{BE}$=emitter base volt for the full scale input signal

Calculated values for the resistors should be tested on an actual circuit. Bandwidth testing should be performed for input signals close to zero volts, where the gain of the circuit tends to be highest and the bandwidth of the circuit tends to be lowest. If the bandwidth is found to be unsatisfactory, the resistor value should be scaled while complying with the constraint that lines I and II be above the ideal transfer function curve III.

Frequency stability should be verified for the high end of the dynamic range. If the frequency stability is found to be unsatisfactory, the value of $R_s$ should be increased while complying with the constraints on lines I and II discussed above.

Because the programmable analyzer should be able to handle abrupt changes in the optical input signal, the nonlinear gain circuit should have an appropriate settling time after the input of a step signal. If the settling time is found to be unsatisfactory, the resistor value should be scaled.

Figure 10:
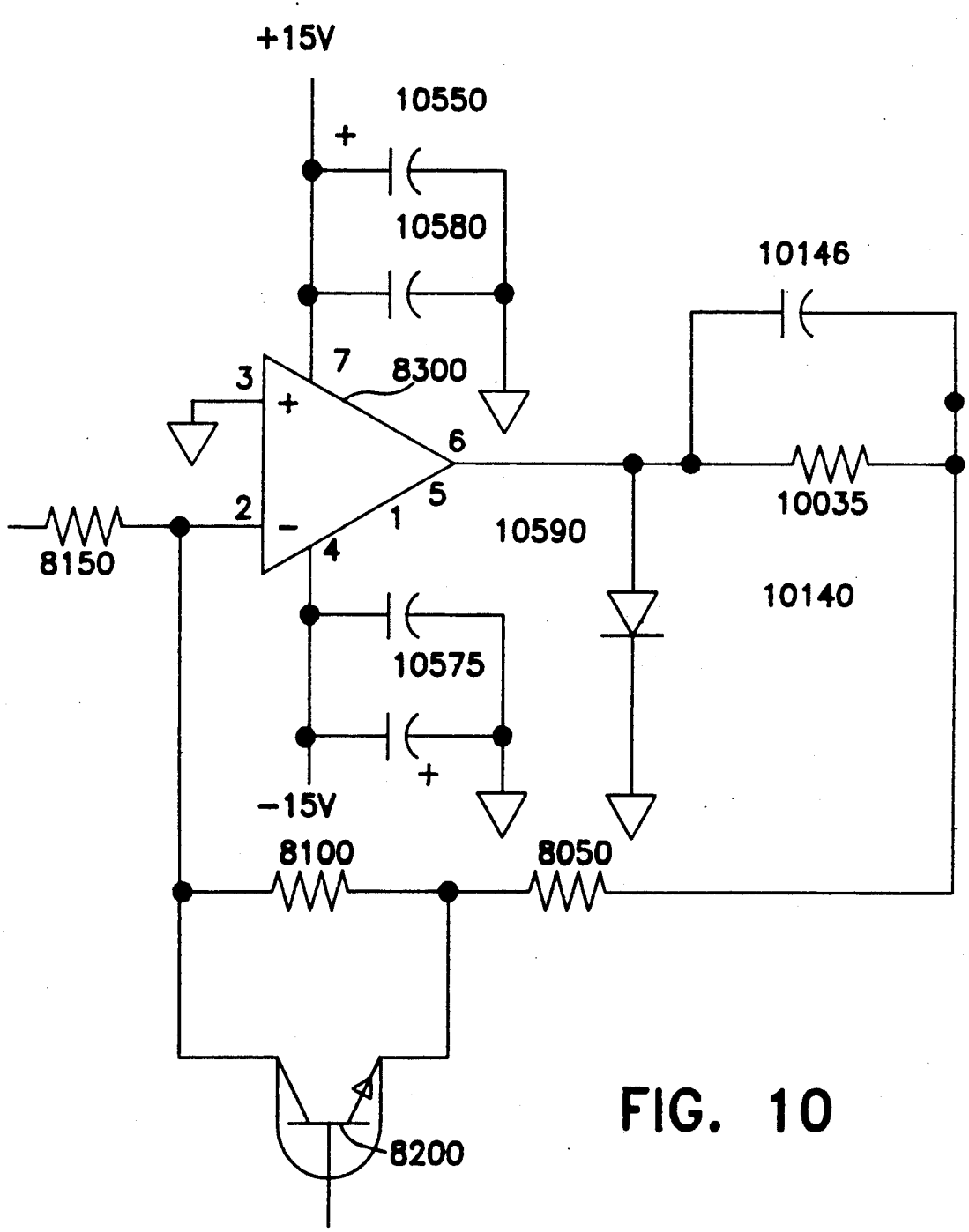
FIG. 10 is a detailed circuit diagram illustrating an actual implementation of the circuit of FIG. 8.

The preferred embodiment of circuit 8000 has been implemented with values resulting in a suitable transfer function, a minimum dynamic range of $2^{18}-1$, and frequency response range of dc to 500 kHz. FIG. 10 shows an actual implement in FIG. 8 in more detail. Amplifier 8300 is an HA5170 and transistor 8200 is an AD811. Resistor 8150 has a value of 10.0K−1%, resistor 8100 has a value 61.9K−1%, and resistor 8050 has a value of 1.3K−1%. The diode, capacitors, and additional resistors in FIG. 10 are used to implement other functions in addition to the noise shaping described above. Capacitor 10146, having a value of 20pf, together with resistor 10035, having a value of 8.66KΩ−1%, affect the circuit transient response. Capacitors 10550, 10575, 10580, and 10590 filter the power supplies. Capacitors 10550 and 10575, each having a value of 4.7μf, are low frequency bypass capacitors, and capacitors 10580 and 10590, each having a value of 100nf, are high frequency bypass capacitors. Diode 10140, which is an HSMS - 2800, reduces positive swings of the circuit, allowing faster recovery from negative input spikes caused by transients in the system. In other words, diode 10140 improves circuit settling time.

The EG&G PARC OMA IV CCD detector employs this circuitry to implement an 18 bit, 2 μs A/D converter.

With a fixed linear gain, instead of the nonlinear gain of the first preferred embodiment, a gain of 4–5 electrons per count (LSB) would not be achievable without reducing the dynamic range. The CCD can produce 1.3 million electrons at full scale. Without nonlinear gain only 82,000 electrons could be accepted without exceeding the input limit of the A/D convertor. In order to fit 1.3 million electrons into 14 bits, the gain would have to be nearly 80 electrons per count. Thus, low scale resolution would be reduced by factor of sixteen.

In the first preferred embodiment of the present invention, RMS noise>q for 100% of the dynamic range, and RMS shot noise>q for the upper 99.94% of the dynamic range. A system having RMS noise>q for only the lower 95%, for example, of the dynamic range might be acceptable for some applications. For example, if full scale range is 0 to 262,143 counts, RMS noise<=q in the region of 250,000 to 262,143 might be acceptable for some applications.

Figure 11:
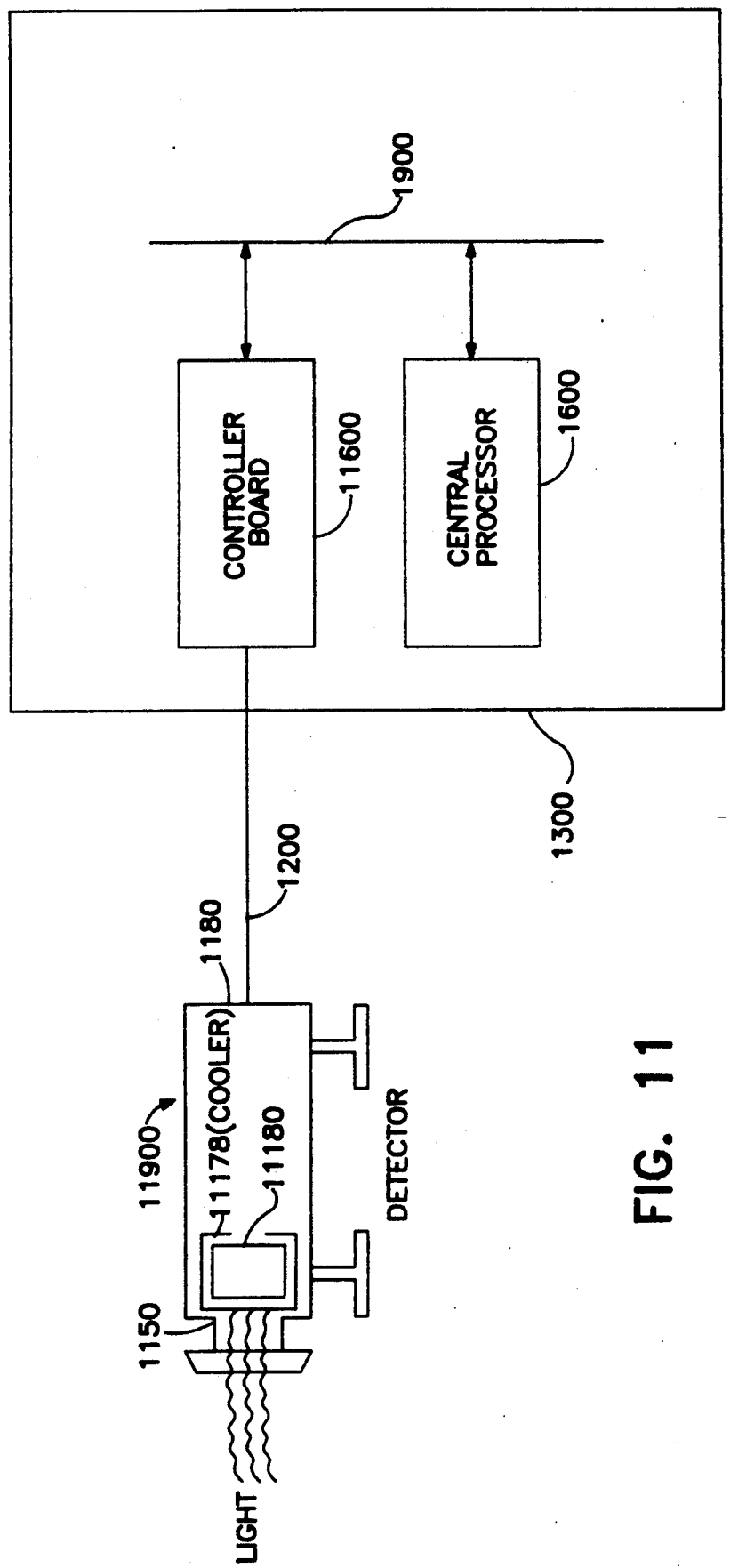
FIG. 11 is a diagram of a general purpose system for digitizing an optical signal according to a second preferred embodiment of the present invention.

FIG. 11 shows a general purpose optical analyzer according to a second preferred embodiment of the present invention. Parts of FIG. 11 roughly corresponding to part of FIG. 1 are labeled with corresponding reference numbers. One difference between the second and first preferred embodiments of the present invention is that the second preferred embodiment employs a photodiode array (PDA), instead of a CCD. PDA 11180 may be a linear photodiode array, random access linear photodiode array or area photodiode array. Controller board 11600 controls detector 11900. Controller board 11600 plugs into a 16 bit IBM AT-compatible computer.

The second preferred embodiment is programmable for a diverse variety of spectroscopic applications including Raman, luminescence, phosphorescence, pump/probe and astronomical photometry. The programmable analyzer of the second preferred embodiment has a dynamic range of 18 bits (262,144:1) and a gain of between 500 to 2000 electrons per count (per least significant digit) of digital output, as will be discussed later.

Similar to the first preferred embodiment, the manner in which PDA 11180 is read out is an important the second preferred embodiment. A user may specify a scan program, as discussed below, using a menu generated by central processor 1600 executing a program. FIG. 12 shows a simplified view of PDA 11180, which is a 1×512 pixel EG&G reticon RL0512SR random access linear array. PDA 11180 may be conceptualized as a row of light sensitive accumulator sites, called photosites. Each of the 512 pixels has an area 26 um×2500 um. When the row is exposed to a spectral source, photons striking the face of the row deplete charge in the photosites. Charge is depleted over an exposure time. The depleted charge in each photosite is steered one pixel at a time to the video output by a multiplexer in response to control signals applied to PDA 11180.

FIG. 13 shows a 1×512 pixel EG&G reticon RL0512SA sequential access linear array, which may substituted for the linear photodiode array shown in FIG. 12.

A particular scan program may cause the depleted charge in each photosite to be subjected to "grouping", such that the depleted charge from multiple photosites is summed in PDA 11180 interface board electronics before being converted to a digital number. Grouping has certain advantages such as increased detector sensitivity to low level light and, depending on the scan program, reduced readout time.

A user generates a scan program using a menu by specifying "point", and by selecting a group. A group is a set of pixels for which data are grouped together in the PDA 11180 interface board electronics. Specification of a group includes a number of points, a starting point specifying the position of the first pixel to be used during data acquisition. The points can be specified to be uniform such that there will be no gaps between points, or the points can be specified to be nonuniform, in which case each point must have its own starting position specified. Group regions can also similarly be specified, by number of groups and their respective starting position.

Because the user has the option of specifying how each of the 512 pixels of PDA 11180 is to be processed and the order of group processing, the number of different possible scan programs, PDA readout schemes, is very large.

In addition to the scan program discussed above, a user may also write a data acquisition program that determines the order of events that are to occur when data is acquired. The data acquisition program causes the scan program to be executed one or more times. In the second preferred embodiment, the user writes the data acquisition program using a DOS text editor or word processor capable of retrieving and saving ASCII text files.

The user may also select PDA read rate and PDA operating temperature using a keyboard.

Figure 14:
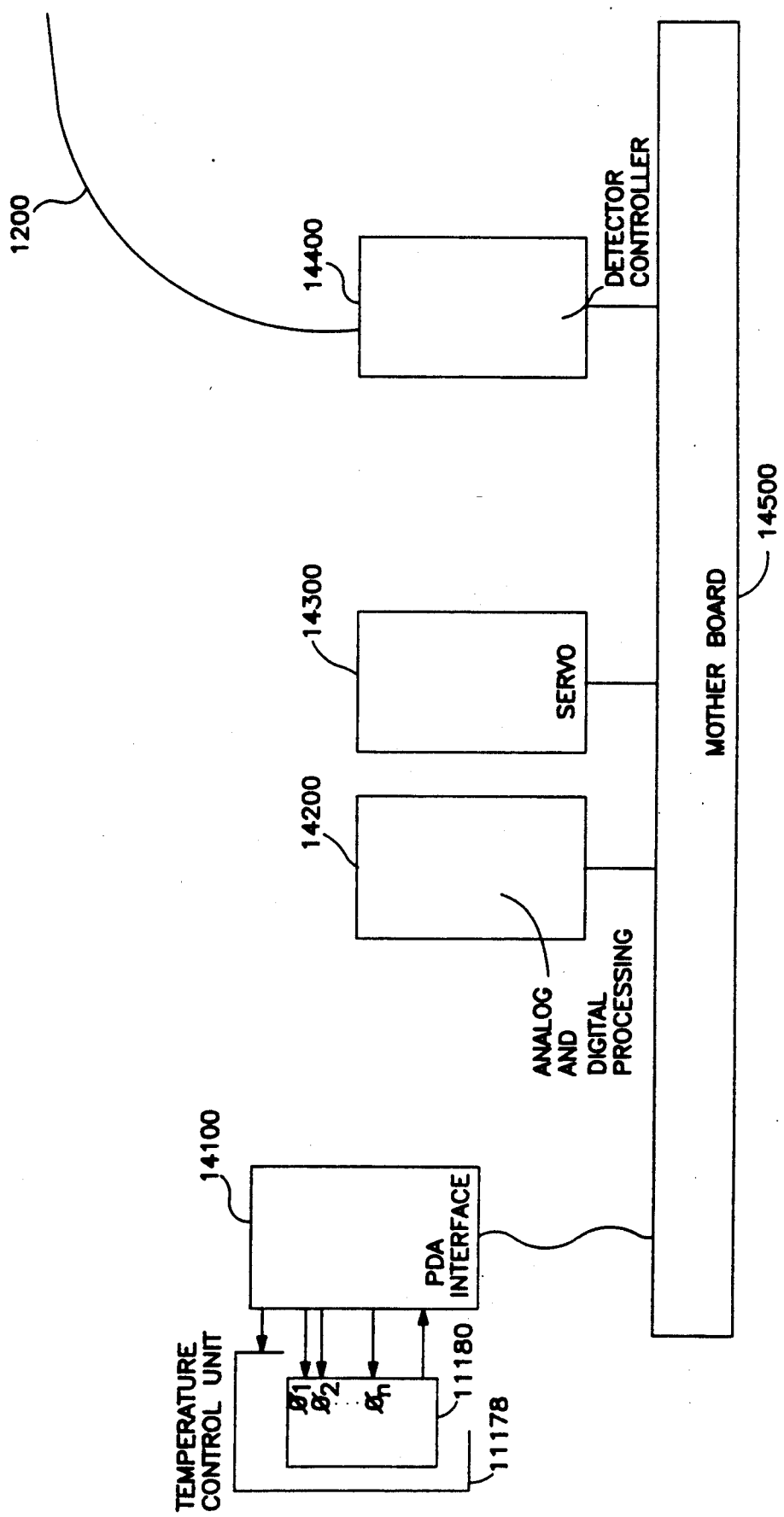
FIG. 14 is a block diagram emphasizing an aspect of the detector shown in FIG. 11.

FIG. 14 is a block diagram showing detector 11900 in more detail. PDA interface board 14100 is located near the front of the detector and functions as an interface between PDA 11180 and other portions of the detector. PDA interface board 14100 distributes power to PDA 11180, and PDA temperature control unit 11178. PDA interface 14100 supplies address signals $A_1$-$A_n$ to select pixel data within PDA 11180 and to read pixel data from PDA. PDA interface 14100 sends an analog signal read from PDA 11180 to analog and digital processing board 14200, which includes clock bias circuitry. Servo board 14300, detector controller board 14400, and mother board 14500 perform functions similar to the corresponding boards of the first preferred embodiment.

If the photodiode array shown in FIG. 13 were being used instead of the photodiode array shown in FIG. 12, the control signals applied to PDA 11180 would be clock signals instead of address signals.

Analog and digital processing board 14200 amplifies the signal from PDA 11180 with a nonlinear gain, as discussed in connection with the first preferred embodiment.

In the second preferred embodiment, detector controller 14400 together with PDA interface board 14100 generate a plurality of clock, or address signals, for PDA 11180 in response to an instruction generated by a processor on controller board 11600.

Figure 15:
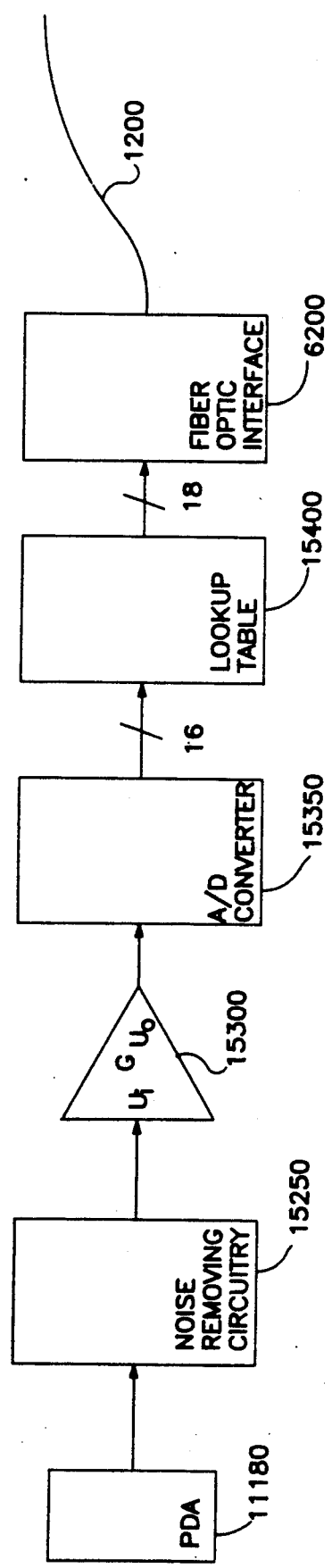
FIG. 15 is a block diagram emphasizing another aspect of the detector shown in FIG. 11.

FIG. 15 is another block diagram of detector 1100, emphasizing a signal path between PDA 11180 and fiber optic link 1200. The signal path shown in FIG. 15, including nonlinear gain circuit 15300, is similar to the signal path shown in FIG. 6 discussed in connection with the first preferred embodiment, except that the lookup table is indexed with a 16 bit value instead of a 14 bit value.

The invention is not limited to the preferred embodiment discussed above. For example, although the scan program of the first preferred embodiment is a set of microcode instructions and a special purpose processor operates to execute the microcode, the set of instructions could be table data and a general purpose microprocessor running a program could operate to execute the table data.

Although preferred embodiments include a hardware lookup table to implement an inverse transfer function, a software table or an algorithm may be employed to implement the inverse transfer function.

Although the preferred nonlinear gain circuit transfer function is a continuous curve, the transfer function could be discreet steps.

Although a CCD and linear photodiode array and a random access diode array have been illustrated, other imaging devices such as area photodiode arrays or a charge injection device may be used.

Although nonlinear gain circuit has been implemented on a separate board from the A/D converter, the nonlinear gain could be part of a commercially available, or custom, nonlinear A/D converter integrated circuit.

Although an IBM AT-compatible interface has been shown, any interface to a typical general purpose computer, such as an Apple Macintosh, may be suitable.

By capitalizing on the fact that shot noise increases as the magnitude of the optical input signal increases, the preferred embodiments of the present invention monotonically reduces gain as the magnitude of the input signal increases, without sacrificing signal resolution. The reduction in gain optimizes the utilization of the A/D convertor, thereby resulting in increased dynamic range.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of applicants' general inventive concept.

We claim:

1. A general purpose system for digitizing an optical signal, the system comprising:
   multielement light sensing means for converting an optical signal to a first signal;
   means for selectively controlling the light sensing means in accordance with a set of instructions;
   means, responsive to the first signal, for generating a second signal having a signal component, and a noise component that is mostly shot noise;
   means for processing the second signal, with a transfer function characterized by a monotonically decreasing slope, to produce a third signal;
   means for converting the third signal to a digital number, wherein, for a majority of the dynamic range, the slope of the transfer function is sufficient such that a change of the second signal equivalent to the standard deviation of the noise component results in at least a one digit change in the digital number; and means for converting the digital number to an output using a function corresponding to an inverse function of the transfer function.

2. The general purpose system of claim 1, wherein the light sensing device includes:
a charge coupled device.

3. The general purpose system of claim 1, wherein the light sensing device includes:
a photodiode array.

4. The general purpose system according to claim 1, wherein the light sensing means includes:
a plurality of photosites each photosite being adaptable to hold a charge, and the controlling means includes means for selecting a first photosite and a second photosite from the plurality of photosites in accordance with the set of instructions; and means for controlling the light sensing means to combine the charge of the first photosite with the charge of the second photosite.

5. The general purpose system of claim 4, wherein the light sensing device includes:
a photodiode array.

6. The general purpose system of claim 4, wherein the light sensing device includes:
a charge coupled device.

7. The general purpose system according to claim 1, wherein the controlling means includes:
first processor means for executing the set of instructions and for generating a series of instructions; and means for generating a plurality of clock signals for the charge coupled device in response to each instruction generated by the first processor means.

8. The general purpose system of claim 7, wherein the light sensing device includes:
a charge coupled device.

9. The general purpose system of claim 7, wherein the light sensing device includes:
a photodiode array.

10. The general purpose system according to claim 7, wherein the clock signal generating means is coupled to, and remote from, the first processor means.

11. The general purpose system according to claim 7, wherein the clock signal generating means is coupled to the first processor means by an interface to a typical general purpose computer.

12. The general purpose system of claim 11, wherein the light sensing device includes:
a charge coupled device.

13. The general purpose system of claim 11, wherein the light sensing device includes:
a photodiode array.

14. The general purpose system according to claim 1, further including:
means for generating the set of instructions, and wherein the controlling means is responsive to the means for generating a set of instructions.

15. The general purpose system according to claim 14, wherein the means for generating a set of instructions includes:
a keyboard.

16. The general purpose system of claim 15, wherein the light sensing device includes:
a charge coupled device.

17. The general purpose system of claim 15, wherein the light sensing device includes:
a photodiode array.

18. The general purpose system according to claim 1, wherein the number converting means includes:
a lookup table.

19. The general purpose system according to claim 1, further including:
means for selecting a read rate from a plurality of read rates, and wherein the controlling means is further responsive to the read rate selecting means and further includes means for reading data from the light sensing means in accordance with the selected read rate.

20. The general purpose system according to claim 19, wherein the read rate selecting means includes:
a keyboard.

21. The general purpose system of claim 20, wherein the light sensing device includes:
a charge coupled device.

22. The general purpose system of claim 20, wherein the light sensing device includes:
a photodiode array.

23. The general purpose system according to claim 1, further including:
means for selecting a temperature from a range of temperatures;

means, responsive to the temperature selecting means, for cooling the light sensing means in accordance with the selected temperature.

24. The general purpose system according to claim 23, wherein the temperature selecting means includes:
a keyboard.

25. The general purpose system of claim 24, wherein the light sensing device includes:
a charge coupled device.

26. The general purpose system of claim 24, wherein the light sensing device includes:
a photodiode array.

27. The general purpose system according to claim 1, wherein the second signal processing means includes
an amplifier having a first input terminal coupled to a reference voltage, and a second input terminal coupled to the receiving means, and an output terminal;

a first resistor having a first end coupled to the amplifier output terminal, and a second end;

a second resistor having a first end coupled to the first resistor second end, and a second input coupled to the amplifier second input terminal;

a transistor having a current path coupled between the first resistor second end and the amplifier second input terminal, and a control input coupled to the reference voltage.

purpose system according to claim 13,

28. The general wherein the second signal processing means further includes:
a third resistor coupled between the second input terminal and the receiving means.

29. A method of operating a general purpose system for digitizing an optical signal, the general purpose system including a multielement light sensing device for converting the optical signal to a first signal, the method comprising the steps of:
selectively controlling the light sensing device in accordance with a set of instructions;

generating, responsive to the first signal, a second signal having a signal component, and a noise component that is mostly shot noise;

processing the second signal, with a transfer function characterized by a monotonically decreasing slope, to produce a third signal;

converting the third signal to a digital number, wherein the slope of the transfer function is sufficient such that, for a majority of the dynamic range, a change of the second signal equivalent to the standard deviation of the noise component results in at least a one digit change in the digital number; and converting the digital number to an output using a function corresponding to an inverse function of the transfer function.

30. A general purpose system for digitizing an optical signal, the system comprising:

charge coupled device means for converting an optical signal to a first signal, including a plurality of photosites, arranged as rows and columns, each photosite being adaptable to hold a charge;

means for selectively controlling the charge coupled device in accordance with a set of instructions;

means, responsive to the first signal, for generating a second signal having a signal component, and a noise component that is mostly shot noise;

means for processing the second signal, with a transfer function characterized by a monotonically decreasing slope, to produce a third signal;

means for converting the third signal to a digital number, wherein, for a majority of the dynamic range, the slope of the transfer function is sufficient such that a change of the second signal equivalent to the standard deviation of the noise component results in at least a one digit change in the digital number; and means for converting the digital number to an output using a function corresponding to an inverse function of the transfer function.

31. The general purpose system according to claim 30, wherein the controlling means includes means for selecting a first photosite and a second photosite from the plurality of photosites in accordance with the set of instructions; and means for controlling the charge coupled device means to combine the charge of the first photosite with the charge of the second photosite.

32. The general purpose system according to claim 30, wherein the controlling means includes:

first processor means for executing the set of instructions and for generating a series of instructions; and means for generating a plurality of clock signals for the charge coupled device in response to each instruction generated by the first processor means.

33. The general purpose system according to claim 30, further including:

means for generating the set of instructions including means for selecting a shift mode from a plurality of shift modes, and wherein the controlling means is responsive to the means for generating a set of instructions.

* * * * *

UNITED STATES PATENT AND TRADEMARK OFFICE
CERTIFICATE OF CORRECTION

PATENT NO. : 5,198,816

DATED : March 30, 1993

INVENTOR(S) : John T. Kalinowski and A. Waczynski

It is certified that error appears in the above-identified patent and that said Letters Patent is hereby corrected as shown below:

Claim 27, column 14, line 57, delete "purpose system according to claim 13,".

Claim 28, column 14, line 58, after "The general", insert --purpose system according to claim 13--.

Signed and Sealed this

Twenty-eighth Day of December, 1993

Attest:

BRUCE LEHMAN

*Attesting Officer*        *Commissioner of Patents and Trademarks*